United States Patent [19]
Penn

[11] Patent Number: 5,814,690
[45] Date of Patent: Sep. 29, 1998

[54] FLAME RETARDED POLY(BUTYLENE TEREPHTHALATE) COMPOSITION

[75] Inventor: Robert Earl Penn, Wilmington, Del.

[73] Assignee: E. I. du Pont de Nemours and Company, Wilmington, Del.

[21] Appl. No.: 935,334

[22] Filed: Sep. 22, 1997

[51] Int. Cl.$^6$ ...................................................... C08K 5/34
[52] U.S. Cl. ............................ 524/100; 524/86; 524/91; 524/115; 524/119; 524/127; 524/188; 524/789; 525/437
[58] Field of Search ................................ 524/86, 91, 100, 524/115, 119, 127, 188, 789; 525/437

[56] References Cited

U.S. PATENT DOCUMENTS

| | | | |
|---|---|---|---|
| 4,278,591 | 7/1981 | Granzow | 524/102 |
| 5,618,865 | 4/1997 | Martens et al. | 524/100 |
| 5,708,065 | 1/1998 | Martens et al. | 524/100 |

FOREIGN PATENT DOCUMENTS

| | | |
|---|---|---|
| 0 491 986 A1 | 7/1992 | European Pat. Off. . |
| 0 685 518 A2 | 6/1994 | European Pat. Off. . |
| 0 661 342 A1 | 7/1995 | European Pat. Off. . |

*Primary Examiner*—Samuel A. Acquah

[57] ABSTRACT

A thermoplastic molding composition comprising poly (butylene terephthalate), a reinforcing component, and a mixed flame retardant containing melamine pyrophosphate and an aromatic phosphate oligomer in selected proportions exhibits improved flame resistance, relatively low melt viscosity for good melt processability, and good physical properties, particularly tensile strength and tensile elongation.

7 Claims, No Drawings

FLAME RETARDED POLY(BUTYLENE TEREPHTHALATE) COMPOSITION

BACKGROUND OF THE INVENTION

The present invention relates to an improved flame retarded poly(butylene terephthalate) composition, and, more particularly, to the use of melamine pyrophosphate in combination with an aromatic phosphate oligomer in producing reinforced flame retardant polyester compositions.

Thermoplastics are useful in many applications, but one drawback is a tendency of some of them to burn or drip when exposed to flames. The ability of a polymer composition to resist flames may be measured by a variety of tests, such as the Underwriter's Laboratories UL-94 test. Resistance to burning and dripping can often be improved by adding substances which act as flame retardants, but in turn these can cause other problems. For instance, halogen-containing flame retardants can release toxic fumes when exposed to high temperatures, or the flame retardant of choice may adversely affect subsequent processing and/or the physical properties of the compounded polymer composition. With respect to poly(butylene terephthalate), i.e., (PBT), there is a need for new non-halogen-containing flame retardant systems Aromatic phosphate oligomers, such as resorcinol bis-diphenyl phosphate (RDP), have been used individually at various concentrations as flame retardants in polymer compositions, including PBT, as described in European Patent Applications 491,986 and 685,518.

Melamine pyrophosphate (MPP) is also known to be useful in flame retarding polymers, including PBT, as described in U.S. Pat. Nos. 4,278,591 and 5,618,865. The use of MPP in combination with an aromatic phosphate oligomer, however, offers improved flame retardant properties for reinforced polyester compositions, and these properties are not evident from available published references.

SUMMARY OF THE INVENTION

The present invention resides in the discovery that melamine pyrophosphate can be used in combination with a liquid aromatic phosphate oligomer, such as resorcinol bis-diphenyl phosphate, to impart improved flame retarding qualities to thermoplastic polymer compositions comprising PBT, and especially reinforced PBT compositions, without degrading the composition's mechanical properties in use.

The present invention is a flame retarded polyester composition which comprises:

(a) from about 5% by weight to about 45% by weight based on [(a)+(b)] of a reinforcing component; and
(b) from about 95% by weight to about 55% by weight based on [(a)+(b)] of a polymeric component which comprises:
  (i) from about 65% by weight to about 45% by weight of poly(butylene terephthalate); and
  (ii) from about 35% to about 55% by weight based on said polymeric component of a mixed flame retardant consisting essentially of from about 5% to about 25% by weight of an aromatic phosphate oligomer of the formula (I)

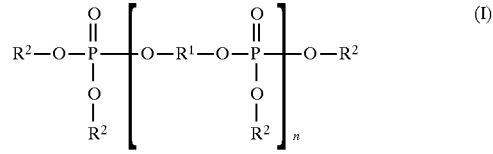

wherein $R^1$ is an arylene moiety and each $R^2$ is independently aryl or substituted aryl, n is an integer of 1 to 5; and from about 95% to about 75% by weight of melamine pyrophosphate.

According to another aspect, the present invention is a method of flame retarding a poly(butylene terephthalate) polymer composition wherein the polymer composition comprises:

(a) from about 5% by weight to about 45% by weight based on [(a)+(b)] of a reinforcing component; and
(b) from about 95% by weight to about 45% by weight based on [(a)+(b)] of a polymer component wherein the polymer component comprises from about 65% by weight to about 45% by weight of poly(butylene terephthalate), and wherein the method comprises incorporating into the poly(butylene terephthalate) from about 35% by weight to about 55% by weight of a mixed flame retardant which consists essentially of from about 5% by weight to about 25% by weight of an aromatic phosphate oligomer of the formula (I)

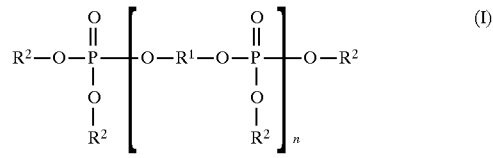

wherein $R^1$ is an arylene moiety and each $R^2$ is independently aryl or substituted aryl, and n is an integer of 1 to 5, and from about 95% by weight to about 75% by weight of melamine pyrophosphate.

In a preferred embodiment of the invention, the reinforcing component is glass fiber, the aromatic phosphate oligomer is resorcinol bis-diphenyl phosphate, and the poly (butylene terephthalate) is a homopolymer.

DETAILED DESCRIPTION OF THE INVENTION

The terms poly(butylene terephthalate) and PBT as used herein mean a polymer having the repeat unit (II)

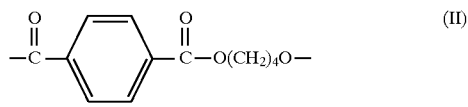

which may contain up to 10 mole percent of other polyester repeat units, but preferably contains just (II) as the repeat unit, i.e., the known homopolymers thereof as well as copolymers thereof with conventional monomers.

The aromatic phosphate oligomer (I) used herein contains an arylene moiety. By an arylene moiety ($R^1$) is meant a divalent radical whose free valencies are to carbon atoms of aromatic rings and which may be substituted with other groups, and include p-phenylene, m-phenylene, and

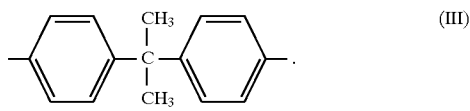
(III)

Preferred $R^1$ are m-phenylene and (III), and m-phenylene is more preferred. It is also preferred that in (I) n=1 with the understanding that many of the phosphates (I) are actually mixtures wherein n is 1 to 5, and when n=1 it means that in about 50 weight percent or more, preferably 60 weight percent or more, of (I), n=1. Useful grades of RDP may contain up to 5 weight percent of triphenyl phosphate. For best results the mixed flame retardant contains from about 10% by weight to about 20% by weight of (I).

By aryl is meant a monovalent radical in which the free valence is to a carbon atom of an aromatic ring. The aryl group may contain one or more aromatic rings which may be fused or connected by a covalent bond, as in biphenyl. It is preferred that all of $R^2$ are phenyl. By substituted aryl is meant an aryl group which may be substituted with one or more substituents, such as alkyl. It is also preferred that each $R^2$ is (unsubstituted) aryl. In a preferred embodiment of the invention, the aromatic phosphate oligomer is resorcinol bis-diphenyl phosphate.

As used herein, the term melamine pyrophosphate, i.e., MPP, means a compound defined by the nominal formula $(C_3H_6N_6)_2H_4P_2O_7$. Commercially available grades of MPP may have substantial impurities in terms of having a different ratio of phosphorous to nitrogen and/or having present other phosphorous containing anions. Nevertheless, all materials either having the corresponding MPP formula or sold commercially as MPP are intended to be included within the scope of the invention. It has been found that some grades of MPP available from different suppliers may have different efficacies as flame retardants in the present composition. The minimum effective amount of a particular grade of MPP for producing satisfactory results according to the invention may be readily determined by following procedures similar to those given in the Examples. The concentration range of the mixed flame retardant, and the ratio of ingredients therein, take into account that MPP's from different sources can have different efficacies. For best results, the MPP selected for use should be in relatively finely divided form for ease of dispersion in the PBT.

It is preferred that the mixed flame retardant mixture is about 40% to about 50% by weight of component (b).

The reinforcing component is typically selected from the group consisting of glass fiber, glass flakes, glass spheres, carbon fiber, carbon black, clay, mica, talc, $TiO_2$ and the like. Best results in terms of moldability and desirable physical properties in use are achieved when the reinforcing component is glass fiber at a concentration of from 10% to 30% by weight based on the weight of [(a)+(b)].

The physical properties of the polymer composition are determined by the concentration of the reinforcing component which can range from about 5% by weight to about 45% by weight based on the weight of [(a)+(b)]. Other materials may also be present in the composition, usually in small amounts (e.g., <5 weight percent of the total composition), such as antioxidants, tougheners, lubricants and the like. Some items such as carbon black may at times be used as a reinforcing agent or for other functions, such as for pigmentary purposes. Typically, a reinforcing agent or component will be present in the composition in at least 5 weight percent of the total composition.

The improved flame retarded composition described herein is conveniently made by melt mixing the PBT component with the other ingredients in conventional plastics mixing equipment, such as a single or twin screw extruder or a kneader. It is well known in polymer mixing technology that uniform dispersion of the ingredients in the polymer component is important for obtaining consistent physical properties. It is believed that the efficacy of the flame retardant is, in part, affected by the uniformity of its dispersion in the final composition. Therefore, the mixing apparatus used may have an effect on the flame retardance rating of parts molded from the composition. Thus, a twin screw extruder is preferred over a single screw extruder for its improved mixing capability, and larger twin screw extruders usually give better results.

However, the "working" and heating of the polymer and other ingredients in the mixing apparatus should not be so severe as to cause overheating and decomposition of one or more of the materials being mixed. For best results the melt temperature of the composition exiting the mixing apparatus should be no more than about 305° C., preferably less than about 295° C., since higher temperatures may cause undesirable decomposition of the ingredients, especially the MPP.

The amounts of the various ingredients in the novel composition are selected so that the composition may be readily processed into useful parts or shapes, have reasonably good physical properties, such as tensile strength and tensile elongation, and also have excellent flame resistance. Compositions containing only MPP as the fire retardant tend to have very high melt viscosities and low tensile elongation when enough MPP is added to make the composition highly flame resistant, for instance capable of achieving a V-0 rating in the UL-94 test at 0.79 mm (1/32") thickness. A high melt viscosity prevents certain parts from being molded, such as parts with thin cross sections. The V-0 rating at relatively low thickness in the range of 0.79 mm is often very difficult to achieve. It is significant, therefore, that flame retarded compositions have a UL-94 rating of V-0 at 0.79 mm thickness.

When aromatic phosphate oligomers such as (I) are used as the sole flame retardant in a polyester composition, substantial quantities are normally required to achieve good flame resistance, but when these quantities are incorporated into the composition, it will not usually be rated V-0 in the UL-94 test because of excessive dripping. Also, compositions with large amounts of (I) will often have generally lower maximum use temperatures and poor tensile strength.

However, the selected combination of MPP and (I) in filled PBT compositions according to the invention yields a thermoplastic composition having a good balance for commercial purposes of melt viscosity, flame resistance, and final physical properties. These compositions are useful as molding resins, such as for electrical or automotive parts. The effects of too high or too low a concentration of MPP are illustrated in Comparative Examples A, B and D, while the effects of too high or too low a concentration of (I) are illustrated in Comparative Example E. The Examples and Comparative Examples also illustrate the effect of the overall level of flame retardant present in the composition.

In the Examples melt viscosity was determined using a Kayness Model 8052 viscometer (Kayness Corp., Morgantown, Pa.) at 250° C. and a shear rate of 1000/sec. Tensile strength and elongation were determined by the method of ASTM D638, using a sample thickness of 0.32 cm (1/8"). The UL-94 test was run according to Underwriter's Laboratories standard UL-94 vertical burn test at the thickness indicated.

Samples for testing were prepared by injection molding pellets (cut from a strand extrusion; the individual examples provide mixing and extrusion conditions) into the appropriate parts on a 6 oz.(0.17 kg) Van Dorn (Cleveland, Ohio) injection molding machine with a barrel temperature profile of 260° C. (all zones) and a mold temperature of 100° C.

In the Examples, the RDP was FYROLFLEX® obtained from AKZO Nobel Chemicals, Inc., Dobbs Ferry, N.Y., and had the nominal formula (IV)

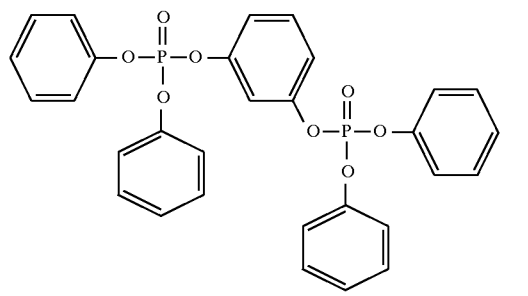

Another example of an aromatic phosphate oligomer within the scope of the invention, bis-phenol A bis-diphenyl phosphate, (BDP) was also obtained from AKZO Nobel Chemicals, Inc., Dobbs Ferry, N.Y., and had the nominal formula (V)

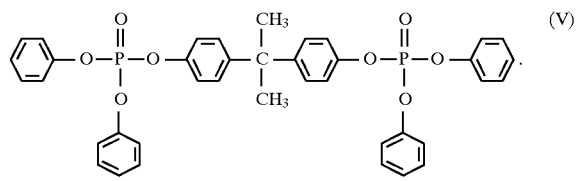

The following were the sources of MPP:

Comparative Example A and B and Examples 1–4: MEL-BAN® 1100, Matrixchem, Inc., Bondville, Vt.

Comparative Examples C and D and Examples 5 and 7: Aerogard® MPP, CYTEC Industries, Inc., West Patterson, N.J.

Example 6: Albi® MPP, Stanchem, Inc., East Berlin, Conn.

EXAMPLES 1–5 AND COMPARATIVE EXAMPLES A–D

In all of the Examples and Comparative Examples the final composition contained 20% by weight chopped glass fiber made by PPG Industries, Pittsburgh, Pa.

The compositions of Examples 1–4 and Comparative Examples A and B were mixed in a 5.1 cm (2") diameter single screw Sterling extruder, and all of the ingredients were fed together at the rear of the extruder. The screw was run at 60 rpm with a barrel temperature of 260° C. (all zones). The melt temperature of the composition exiting the extruder ranged from 284° C. to 290° C.

The compositions of Examples 5 and Comparative Examples C and D were mixed on a 40 mm Werner & Pfleiderer having a twin co-rotating screw configuration. The screws were run at 300 rpm and the temperature profile of the barrel was 260° C. (all zones). The melt temperature of the composition exiting the extruder ranged from 281° C. to 312° C. The materials were fed to the extruder in the following ways: PBT at rear, chopped glass fiber and MPP after the melting zone, and RDP injected just before the die.

The properties of the compositions produced are shown in Tables 1 and 2. The UL-94 results are given as the total burning time (seconds) of 5 bars, followed by the UL-94 rating.

TABLE 1

| Example No.: | A | B | 1 | 2 | 3 | 4 |
|---|---|---|---|---|---|---|
| % MPP | 37 | 42 | 40 | 37 | 34 | 29 |
| % RDP | — | — | 2 | 5 | 5 | 5 |
| Visc, 250° C. (Pa · s) | 534 | 662 | 462 | 402 | 341 | 310 |
| Tensile Str. (MPa) | 76.5 | 71.7 | 76.5 | 78.6 | 86.9 | 93.1 |
| Elongation (%) | 1.22 | 0.94 | 1.29 | 1.81 | 2.27 | 2.67 |
| UL-94 1/16" | 148,— | 10,V-0 | 3,V-0 | 3,V-0 | 15,V-0 | 170,— |
| UL-94 1/32" | — | 49,V-2 | 39,V-2 | 15,V-0 | 60,— | — |

TABLE 1

| Example No.: | C | 5 | D |
|---|---|---|---|
| % MPP | 38.0 | 31.3 | 28.0 |
| % RDP | — | 6.7 | 10.0 |
| Visc. 250° C. (Pa · s) | 384 | 217 | 161 |
| Tensile Str. (MPa) | 107 | 93.1 | 79.3 |
| Elongation (%) | 1.82 | 2.61 | 3.05 |
| UL94 1/16" | 15,V-0 | 14,V-0 | 11,V-0 |
| UL94 1/32" | 44,V-1 | 24,V-0 | 78,V-2[a] |

[a]Failed because of flaming drips.

EXAMPLES 6 AND 7

Example 6 was conducted in the same manner as Example 5, except BDP was used in place of RDP, and the amounts of MPP and BDP were as shown. The melt temperature was 300° C. Details are given in Table 3.

Example 7 was conducted in a manner similar to that of Example 5 except that a 30 mm Werner and Pfleiderer twin screw extruder was used, and the melt temperature was 306° C. Also 0.8% by weight (of the total composition) of carbon black was present in the composition. Details are also shown in Table 3.

TABLE 3

| Example No.: | 6 | 7 |
|---|---|---|
| % MPP | 33.0 | 33.0 |
| % RDP | — | 7.0 |
| % BDP | 7.0 | — |
| Visc. 250° C. (Pa · s) | 259 | — |
| Tensile Str. (MPa) | 88.2 | 78.6 |
| Elongation (%) | 2.5 | 2.1 |
| UL94 1/16" | 12,V-0 | 2,V-0 |
| UL94 1/32" | 32,V-0 | 5,V-0 |

What is claimed is:

1. A flame retarded polyester composition which comprises:
   (a) from about 5% by weight to about 45% by weight based on [(a)+(b)] of a reinforcing component; and
   (b) from about 95% by weight to about 55% by weight based on [(a)+(b)] of a polymeric component which comprises:
      (i) from about 65% by weight to about 45% by weight of poly(butylene terephthalate); and
      (ii) from about 35% to about 55% by weight based on said polymeric component of a mixed flame retardant consisting essentially of from about 5% to about 25% by weight of an aromatic phosphate oligomer of the formula (I)

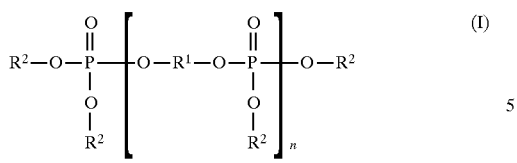

wherein $R^1$ is an arylene moiety and each $R^2$ is independently aryl or substituted aryl, n is an integer of from 1 to 5; and from about 95% to about 75% by weight of melamine pyrophosphate.

2. The composition of claim 1 wherein $R^1$ is m-phenylene, each $R^2$ is phenyl, and n is 1.

3. The composition of claim 2 wherein the reinforcing component is selected from glass fiber and carbon black.

4. The composition of claim 1 wherein the reinforcing component is present in a concentration of from 10% by weight up to about 30% by weight based on the weight of [(a)+(b)], and the mixed flame retardant is present at a concentration of from 40% by weight to about 50% by weight based on the weight of the polymeric component.

5. A method of flame retarding a poly(butylene terephthalate) polymer composition wherein the polymer composition comprises:

(a) from about 5% by weight to about 45% by weight based on [(a)+(b)] of a reinforcing component; and (b) from about 95% by weight to about 45% by weight based on [(a)+(b)] of a polymer component wherein the polymer component comprises from about 65% by weight to about 45% by weight of poly(butylene terephthalate), and wherein the method comprises incorporating into the poly(butylene terephthalate) from about 35% by weight to about 55% by weight of a mixed flame retardant which consists essentially of from about 5% by weight to about 25% by weight of an aromatic phosphate oligomer of the formula (I)

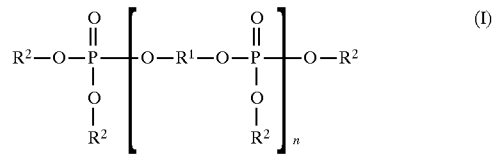

wherein $R^1$ is an arylene moiety and each $R^2$ is independently aryl or substituted aryl, and n is an integer of 1 to 5, and from about 95% by weight to about 75% by weight of melamine pyrophosphate.

6. The method of claim 5 wherein $R^1$ is m-phenylene, each of $R^2$ is phenyl, and n is 1.

7. The method of claim 6 wherein the reinforcing component is selected from glass fiber and carbon black.

* * * * *